Figure 1:
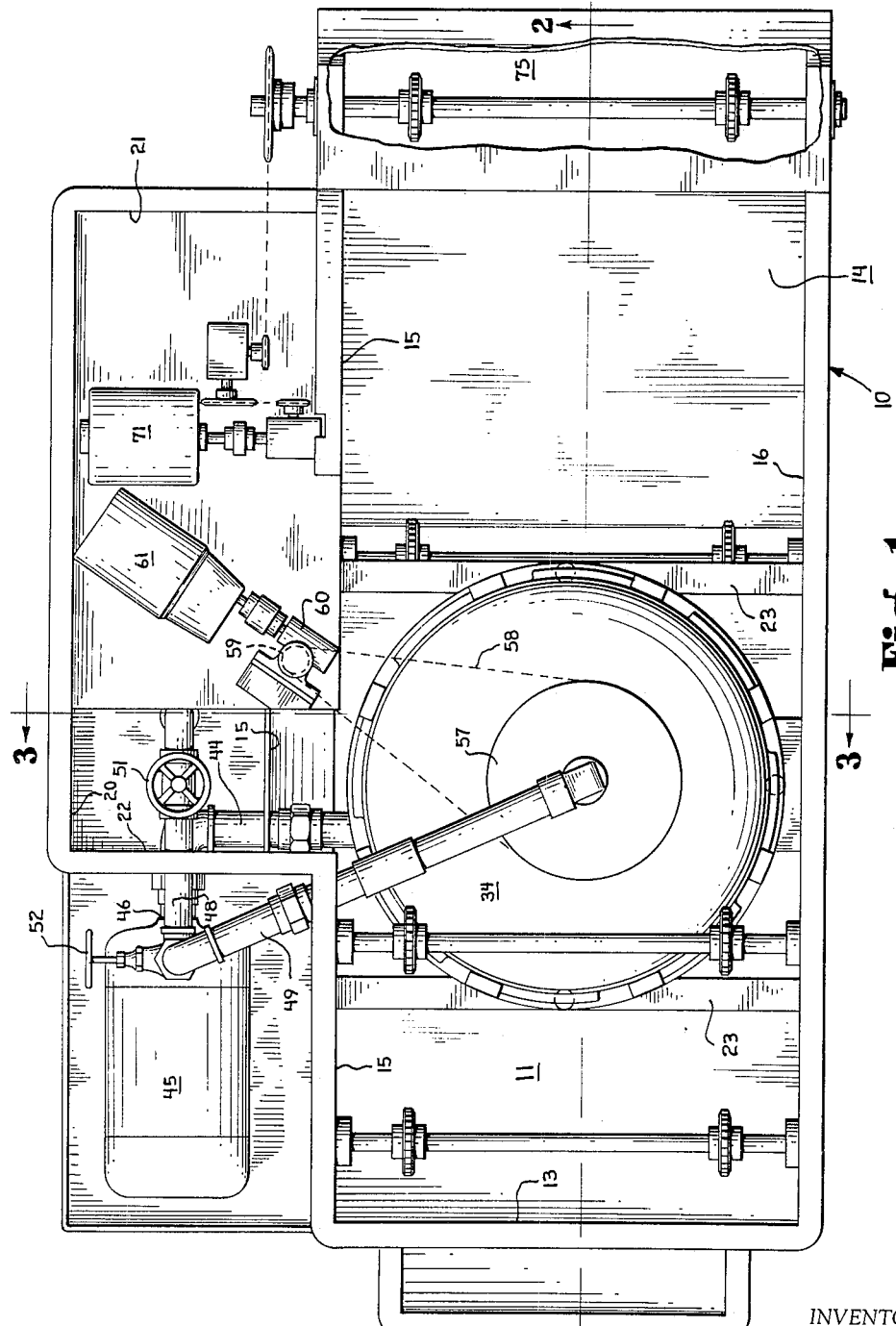

Jan. 11, 1966  J. R. MUMMERT ETAL  3,228,528
AUTOMATIC FILTERING APPARATUS
Filed Aug. 3, 1962  4 Sheets-Sheet 1

INVENTOR.
JOHN R. MUMMERT,
EARL E. TRAMMEL,
BY JOHN D. SHINN & ORIEN K. NORTON

Lockwood, Woodard, Smith & Weikart
Attorneys

Jan. 11, 1966     J. R. MUMMERT ETAL     3,228,528
AUTOMATIC FILTERING APPARATUS
Filed Aug. 3, 1962     4 Sheets-Sheet 3
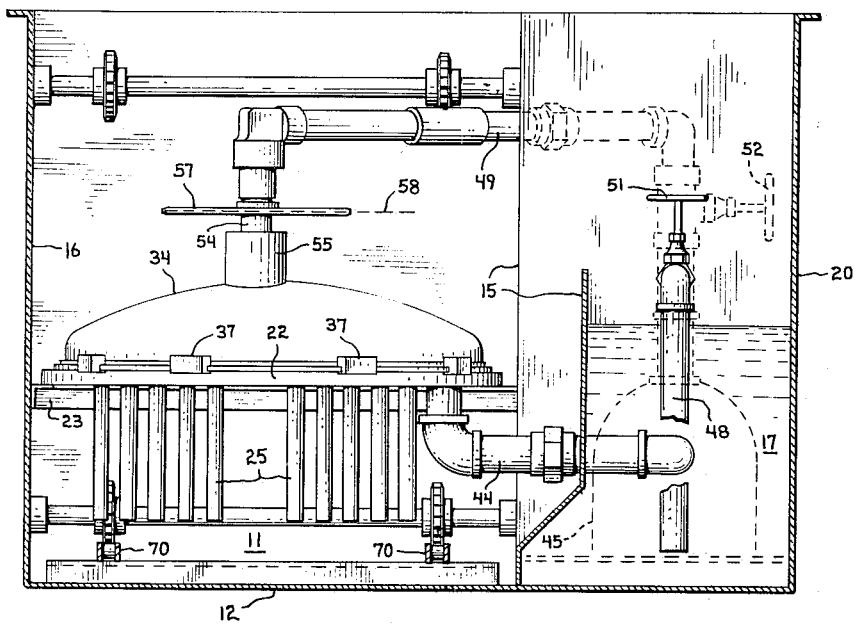
Fig. 3.
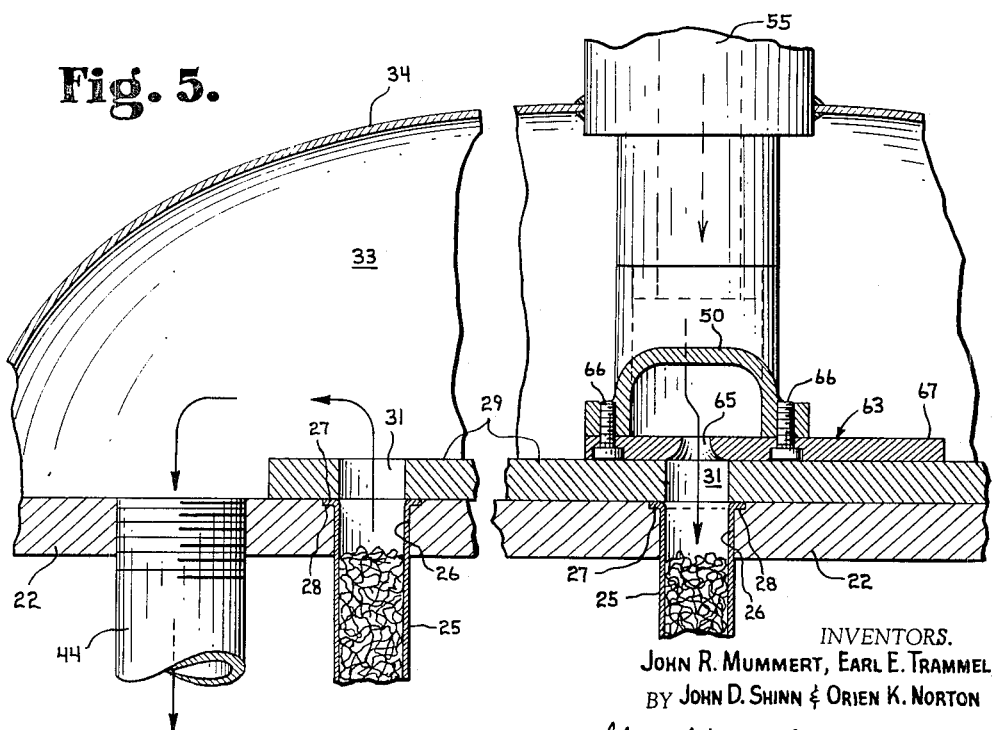
Fig. 5.
INVENTORS.
JOHN R. MUMMERT, EARL E. TRAMMEL,
BY JOHN D. SHINN & ORIEN K. NORTON
Attorneys

INVENTOR.
JOHN R. MUMMERT, EARL E. TRAMMEL,
BY JOHN D. SHINN & ORIEN K. NORTON

Lockwood, Woodard, Smith & Weikart
Attorneys 3,228,528
AUTOMATIC FILTERING APPARATUS
John R. Mummert, Indianapolis, and Earl E. Trammel, John D. Shinn, and Orien K. Norton, Lebanon, Ind., assignors to Commercial Filters Corporation, Melrose, Mass., a corporation of New York
Filed Aug. 3, 1962, Ser. No. 214,548
5 Claims. (Cl. 210—333)

This invention relates generally to filtering apparatus and more particularly to fluid filtering apparatus adapted to filter cutting oils used in connection with metalworking and of the type wherein filtering of the fluid and backwashing of filter units may be carried on simultaneously.

Filtering apparatus of the character described usually includes a number of banks of filters and automatically operated valve and pump apparatus for periodically reversing the flow of the fluid through one filter bank after another for the purpose of removing caked filtrate which accumulates on the surface of the filters. The valves and pumps required for this type of apparatus are complex, expensive and require substantial maintenance. Apparatus of this particular type usually requires timing apparatus as well as floats or other means for controlling fluid levels within the filter tank, all of which further adds to the complexity, expense and maintenance.

Conventional filter apparatus of the type described is also deficient in that thorough cleaning of the filter surfaces is not possible because the caked filtrate may break away from the relatively small portion of the area of the filter thereby permitting free flow of backwash fluid and reducing pressure of the backwash fluid to such a degree that a major portion of the filter surface is not cleaned. Because of this sort of action the volume of filtered fluid is reduced whereby it becomes necessary to shut down the filter apparatus and clean it by hand.

In some conventional types of filter apparatus the cake may be backwashed from the filter surface to a satisfactory degree if the backwash cycle continues for an extended period of time. In such apparatus, however, an excessive supply of cooling fluid must be stored in the filtering system in order to provide a continuous flow of fluid of sufficient volume.

In still another respect, conventional filtering apparatus is unsatisfactory in that there is no interval between flow of backwash fluid and flow of filtered fluid. Thus, filtrate which is released from the filter surface does not have time to settle away from the filter and is immediately redeposited to an excessive degree on the filter surface, thereby reducing the efficiency of the filter apparatus.

Accordingly, the principal object of this invention is to provide filtering apparatus for machine tool coolants which can be operated continuously without interruption and can handle a high rate of fluid flow with extremely high dirt loads.

Another object of this invention is to provide a filtering apparatus including a plurality of filter elements wherein the filter elements may be cleaned one after another with complete removal of caked filtrate from the filter surface.

Still another object of this invention is to provide a filtering apparatus having a high capacity as to volume of fluid flowing through the apparatus but being of relatively small size and having a relatively simple structure.

A further object of this invention is to provide filtering apparatus wherein one filter unit after another may be cleaned but which requires no complex valving system, no apparatus for controlling level of fluid in the tank, and no timing apparatus for initiating and terminating the backwash cycle.

A still further object of this invention is to provide a filtering apparatus which includes means for backwashing each filter element at much more frequent time intervals, which provides a substantially increased volume of backwash fluid through each filter element and which provides an interval after backwashing is completed during which filtrate may settle away from the filter surface before the filter is again activated.

Still another object of this invention is to provide filtering apparatus which is always in balance in the sense that flow of dirt bearing fluid, backwash fluid, and clean fluid is properly proportioned so that liquid levels in the filter tank remain constant without the necessity of providing complex valve systems, floats, and pump control circuits.

In accordance with this invention there is provided a filtering apparatus comprising a tank, a plurality of filter elements disposed in said tank, means connected to said filters for drawing fluid through said filters, and means for cyclically backwashing one filter after another while simultaneously continuing the filtering action in the others of said filters.

The full nature of the invention will be understood from the accompanying drawings and the following description and claims.

Figure 2:
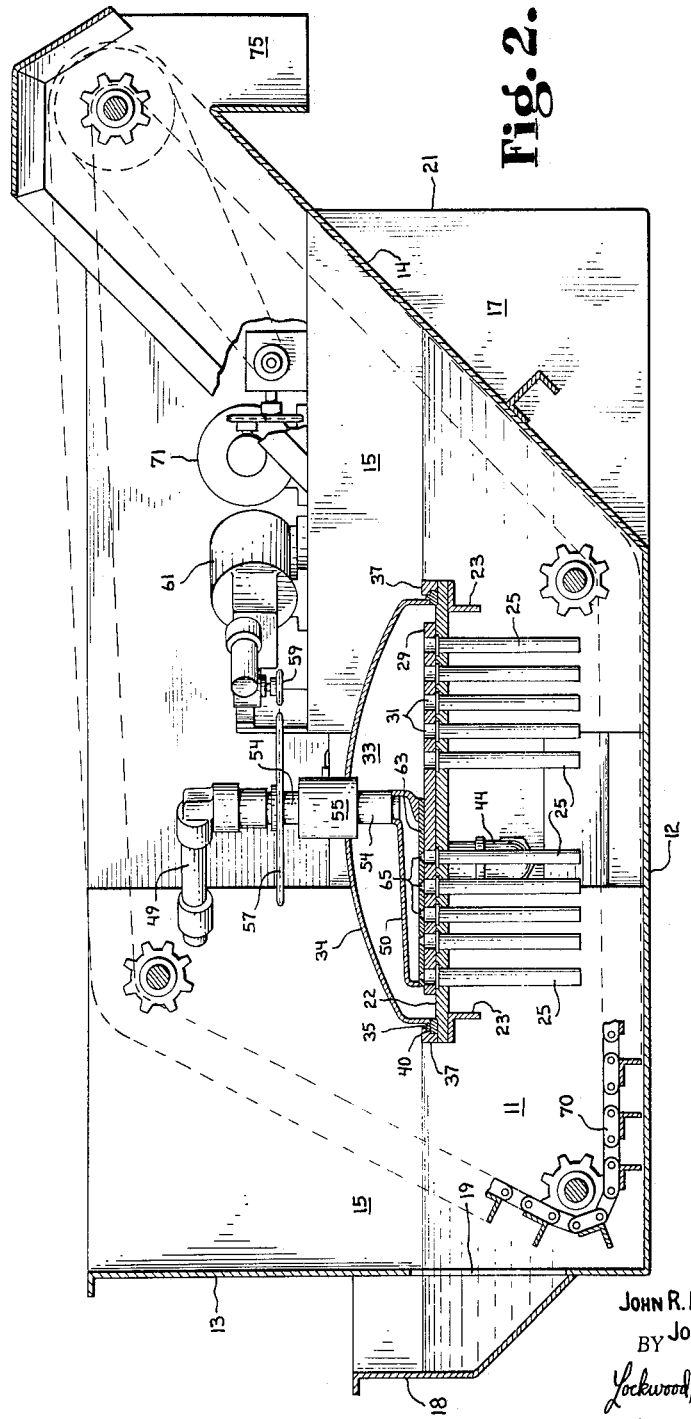
Figure 4:
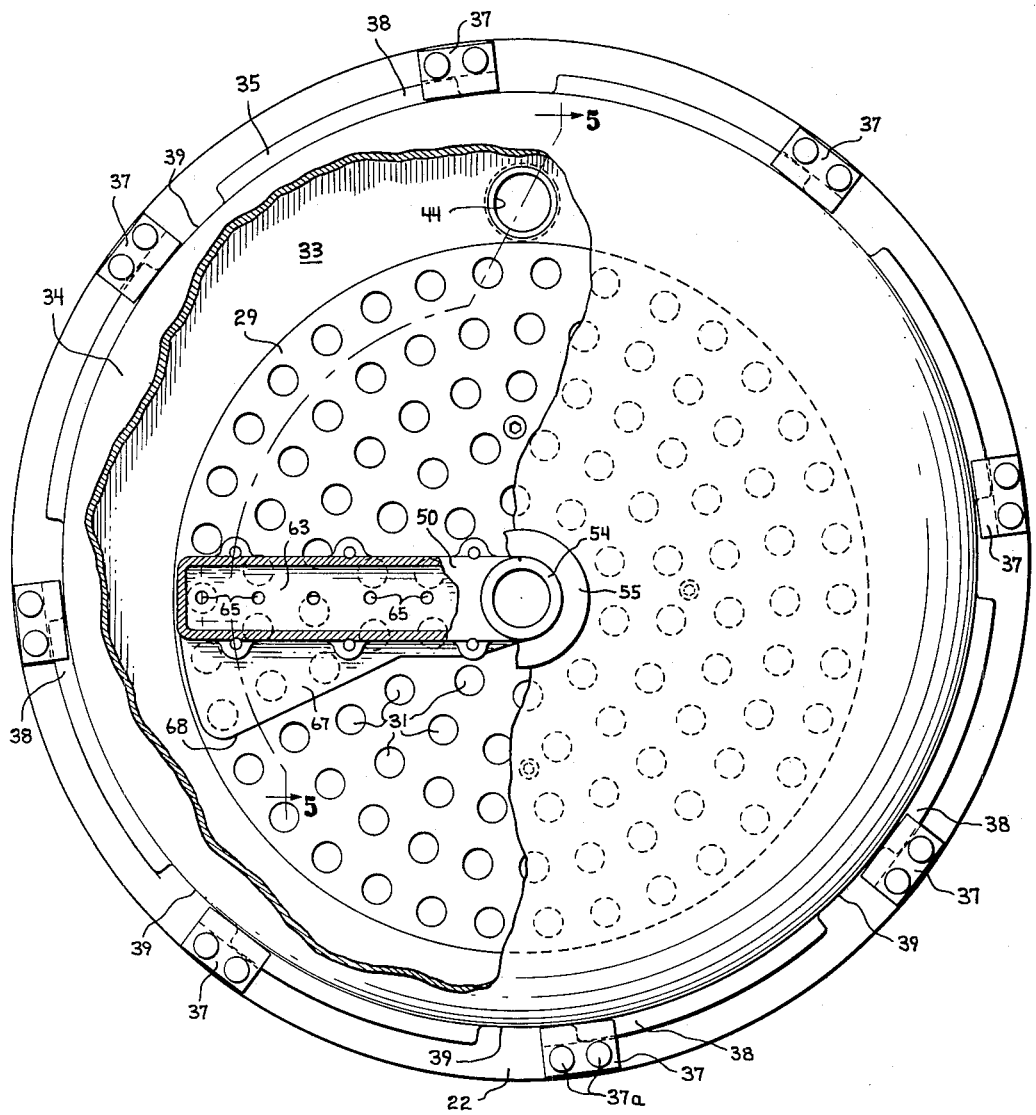

FIG. 1 is a top plan view with parts broken away illustrating the filtering apparatus of this invention.
FIG. 2 is a cross section taken on line 2—2 of FIG. 1.
FIG. 3 is a cross section taken on line 3—3 of FIG. 1.
FIG. 4 is an enlarged top plan view with parts broken away to illustrate the filter and the backwashing rotor shown in FIGS. 1, 2 and 3.
FIG. 5 is an enlarged partial cross section taken on line 5—5 of FIG. 4.

Referring to the drawings, the filtering apparatus embodying this invention comprises a tank structure 10 which includes a first tank 11 formed by the bottom wall 12, end walls 13 and 14 and side walls 15 and 16 for receiving dirty oil. A well 18 is attached to end wall 13 and dirty oil or coolant from a machine tool may be dumped therein and fed to tank 11 through a hole 19 in wall 13.

A clean fluid tank 17 is formed by the wall 15, bottom 12, side wall 20 and end walls 21 and 22.

For filtering the dirty fluid there is provided a filter assembly consisting of a base plate 22 mounted on a pair of transverse supports 23 attached to the side walls 15 and 16 by welding or other suitable means. A plurality of conventional tubular filter members 25 may be suspended within the holes 26 of base plate 22, the upper ends of filters 25 being flanged at 27 to rest on the annular shoulders 28 formed in the base plate. The filters 25 are clamped to base plate 22 by means of a hold-down plate 29 welded or otherwise fastened to base plate 22 and including a plurality of holes 31 axially aligned with each of the filters 25. As illustrated in FIG. 4, the holes 31 are arranged in annular rings, and the filters are, of course, similarly arranged. However, it should be noted that the holes 31 in the respective annular rings are not in radial alignment with one another. The purpose of this misalignment will subsequently be explained.

A chamber 33 is formed over the filter elements by a dome-shaped head 34 which rests on and is welded or otherwise attached to a mounting ring 35. The head 34 and ring 35 are clamped as a unit to the base plate 22 by means of retainer members 37 secured thereto by rivets or other suitable means 37a, spaced at equal intervals around the periphery of the ring and engaging ears 38 formed on the periphery of the ring by cutout portions 39. Thus, the head 34 may be removably mounted on the base plate by placing it over the base plate with the cutout portions 39 in alignment with the retainers 37. The head may then be rotated to engage the ears 38 beneath the shoulders 40 of the retainers 37.

For drawing fluid from tank 11 through the filter members 25 there is provided a suction pipe 44 which opens into chamber 33 through base plate 22 as illustrated in FIG. 4. A suction pump and motor 45 is connected to pipe 44 at 46 as illustrated in FIG. 1. The pump discharges clean fluid through a pipe 48 into the clean fluid tank 17 and also discharges clean fluid through a backwash pipe 49 into a rotor 50. The valves 51 and 52 may be adjusted to control the proportion of fluid discharged respectively into the clean fluid tank and the pipe 49.

The rotor 50 may be connected to pipe 49 by means of a tubular spindle 54 rotatably mounted in a hub 55 fixed in any suitable manner to the head 34 so that fluid may flow from pipe 49 into the rotor while it is rotating. For driving rotor 50 and spindle 54 there is provided a sprocket 57 carrying a drive chain 58 operably connected to a drive sprocket 59 forming a part of a speed reduction gear 60. An adjustable speed motor 61 may be connected to the reduction gear 60 thereby to drive the rotor at a selected speed.

Rotor 50 includes a bottom plate member 63 having a plurality of apertures 65 disposed on a radius of the axis of rotation of spindle 54. The apertures 65 are preferably formed to act as nozzles whereby to provide high velocity flow of fluid into the filters. The plate 63 may be secured to rotor 50 by means of suitable machine bolts 66 and includes a trailing edge member 67 which is formed to have greater width toward the peripheral portion of the filter assembly as indicated at 68 (FIG. 4) than does the portion closer to the axis of spindle 54. It should be noted that the individual apertures 65 are each in alignment with one of the annular rows of filters so that fluid may be discharged to each filter in each row of filters. It should further be noted that at any given instant only one filter is subjected to full flow of fluid at full velocity due to the fact that each individual filter in each row of filters is displaced to one side of each filter in any other row of filters. Therefore, full pump pressure is utilized to backwash each filter, and because of this it is possible to remove all of the caked filtrate on the exterior surface of each filter.

Since the trailing portion 67 of the plate 63 extends for a substantial distance from the apertures 65 in a trailing direction, there is a lull between the time that backwash fluid is cut off from a given filter, and the time that that filter is exposed to suction. This lull permits filtrate to settle away from each filter after it is backwashed so that the resumption of suction does not immediately cause excessive caking of filtrate on the exterior surface of the filter.

For removing filtrate which accumulates on the bottom of dirty fluid tank 11 there is provided a scraping apparatus including an endless chain 70 having scraping members thereon and being driven by a motor 71. This mechanism forms no part of this invention but is fully described in United States Letters Patent No. 2,865,509 granted December 23, 1958.

In operation, fluid such, for example, as cutting oils bearing metal particles may be discharged from a machine tool into the tank 11. The pump 45 operates to suck fluid through the filter units 25 and through the pipe 44 to the pump. It will be understood that the filter units which are being backwashed have no suction on them. The valves 51 and 52 may be adjusted to cause 55%, for example, of the output of pump 45 to flow through pipe 48 into the clean tank 17. Forty-five percent of the output of pump 45 may be discharged through the backwash pipe 49 and through the rotor and through at least one nozzle aperture 65 into a filter unit. If, for example, it is desired that 50% of the total pump output shall be supplied to one or more machine tools then 5% of the total pump output may be returned to the tank 11 by means of a weir (not shown). Thus, the system may be maintained in balance without the necessity of providing complex float switches and electrical circuits.

As previously described, the rotor 50 may be rotated at a selected speed by means of motor 61 depending upon the volume of filtrate carried by the dirty fluid and the degree of clarity of clean fluid which is required by the particular machine tool. Because of the displaced relationship of the annular rows of filters each filter receives almost the full flow of backwash fluid for a given interval of time after which the trailing portion 67 of plate 63 blanks off a backwashed filter so that it is neither in suction or in backwash but is dormant. Also, there is restricted suction on each filter unit as the trailing edge of plate 67 uncovers the filter unit. Because of the gradual increase of suction as the filter is opened, the initial cake that is collected on the surface of the filter is deposited at a reduced rate. As filtrate collects in the bottom of the tank 11 it is removed by the scraper apparatus and discharged through the discharge opening 75.

From the foregoing description it will be readily apparent that this invention provides filtering apparatus which can be operated continuously without interruption for the purpose of backwashing the filter units. There is no change of fluid levels during the backwash cycle thereby eliminating any apparatus for controlling fluid levels. Because of the fact that the filter units are each subjected to substantially full flow of backwash fluid, removal of cake is accomplished with high efficiency. Thus, it is possible to utilize a filter assembly having fewer filtering units, and any desired rate of backwash is possible by adjusting the speed of rotation of the backwash rotor.

The invention claimed is:

1. Filtering apparatus comprising a tank, means mounting a plurality of tubular filters disposed in concentric annular rows in said tank with each filter of each row out of radial alignment with the filters of the other rows, means forming a closed chamber over said filters, means connected to said closed chamber for drawing fluid from said tank through said filters, and backwashing means comprising a hollow rotor mounted for rotation over the ends of said filters, means to supply backwash fluid under pressure to said rotor, said rotor having apertures in radial alignment and spaced apart so as to register with said concentric filter rows for cyclically feeding fluid to only a limited number of said filters at one time as the rotor sweeps over said filter ends, said rotor having means to isolate said filters from said closed chamber during backwash.

2. The invention set forth in claim 1 wherein said backwashing means includes means for preventing flow of fluid through each filter for a predetermined interval after it is backwashed.

3. Filtering apparatus comprising a fluid storing tank, means mounting a plurality of filters disposed in concentric annular rows within said tank with each filter of each row out of radial alignment with the filters of the other rows, means forming a closed chamber over said filters, continuously operating pump means connected to said chamber for drawing fluid through said filters, and backwashing means connected to receive fluid from said pump means, said backwashing means including a hollow rotor rotatably mounted within said chamber at the center of said concentric tube rows so as to sweep said filters as it is rotated, said rotor including a chamber and a plurality of apertures opening out of the chamber, said apertures being spaced so as to register with said annular rows of filters, and means for driving said rotor to cyclically isolate a limited number of filters from said closed chamber and to deliver fluid to the isolated filters.

4. A filtering apparatus as claimed in claim 3 wherein said rotor includes means trailing said rotor as it sweeps said filters for preventing any fluid flow through a limited number of filters for a predetermined time interval.

5. The invention set forth in claim 3 wherein said rotor includes means for sequentially removing suction from a filter, feeding fluid to a filter and then removing suction from said filter for a predetermined time interval.

References Cited by the Examiner

UNITED STATES PATENTS

| | | | |
|---|---|---|---|
| 1,359,162 | 11/1920 | Genter | 210—333 X |
| 1,659,459 | 2/1928 | Clarke | 165—95 |
| 1,945,839 | 2/1934 | Von Maltitz | 210—411 |
| 2,204,349 | 6/1940 | Forrest | 210—411 X |
| 2,237,964 | 4/1941 | Haught | 210—333 |
| 2,954,873 | 10/1960 | Davis | 210—411 X |
| 3,074,561 | 1/1963 | Mummert | 210—333 |
| 3,168,469 | 2/1965 | Abdalian et al. | 210—333 X |
| 3,169,109 | 2/1965 | Hirs | 210—456 X |

REUBEN FRIEDMAN, *Primary Examiner.*

HERBERT L. MARTIN, *Examiner.*

T. R. MILES, *Assistant Examiner.*